(12) United States Patent
Khan et al.

(10) Patent No.: US 10,032,036 B2
(45) Date of Patent: Jul. 24, 2018

(54) SYSTEMS AND METHODS OF MULTIDIMENSIONAL ENCRYPTED DATA TRANSFER

(71) Applicants: Shahab Khan, Fremont, CA (US); Jonas Moses, Houston, TX (US); Lucas Lovette, Atlanta, GA (US)

(72) Inventors: Shahab Khan, Fremont, CA (US); Jonas Moses, Houston, TX (US); Lucas Lovette, Atlanta, GA (US)

(*) Notice: Subject to any disclaimer, the term of this patent is extended or adjusted under 35 U.S.C. 154(b) by 0 days.

(21) Appl. No.: 15/014,008

(22) Filed: Feb. 2, 2016

(65) Prior Publication Data

US 2016/0239672 A1   Aug. 18, 2016

Related U.S. Application Data

(63) Continuation-in-part of application No. 13/619,005, filed on Sep. 14, 2012, now Pat. No. 9,251,723.
(Continued)

(51) Int. Cl.
| | |
|---|---|
| *H04K 1/00* | (2006.01) |
| *G06F 21/60* | (2013.01) |
| *G09C 5/00* | (2006.01) |
| *G06Q 20/38* | (2012.01) |
| *G06Q 20/20* | (2012.01) |
| *H04B 5/00* | (2006.01) |
| *H04L 9/14* | (2006.01) |

(Continued)

(52) U.S. Cl.
CPC .......... *G06F 21/606* (2013.01); *G06Q 20/20* (2013.01); *G06Q 20/3823* (2013.01); *G09C 5/00* (2013.01); *H04B 5/0031* (2013.01); *H04L 9/14* (2013.01); *H04W 4/80* (2018.02); *G06Q 2220/00* (2013.01); *H04L 63/0457* (2013.01)

(58) Field of Classification Search
CPC ............ G10L 21/0272; G01C 21/3629; G10H 2210/281; H04R 2499/13; G06F 21/606; H04W 4/008; G09C 5/00; G06Q 20/20; G06Q 20/3823; G06Q 2220/00; H04B 58/0031
See application file for complete search history.

(56) References Cited

U.S. PATENT DOCUMENTS

| | | | | |
|---|---|---|---|---|
| 5,774,357 A | * | 6/1998 | Hoffberg | G06F 3/00 348/110 |
| 6,931,134 B1 | * | 8/2005 | Waller, Jr. | G10H 1/0091 381/119 |

(Continued)

*Primary Examiner* — Khoi V Le
(74) *Attorney, Agent, or Firm* — Next IP Law Group; Benjamin A. Balser

(57) ABSTRACT

Example embodiments of the systems and methods of multidimensional encrypted data transfer disclosed herein also introduce novel and unobvious methods to store and access information. In example embodiments of the systems and methods of multidimensional encrypted data transfer disclosed herein, a multidimensional data structure is developed. For example, at least one additional dimension is added to a 2D data structure. Data may be encoded within multiple facets. Example embodiments of the multidimensional encoding include non-limiting examples of stacking or providing images or tiles in a very short period of time and moving a 3-dimensional object in space. In one example application, a number of distinct 2D data structures are presented over a time period in a .gif file.

10 Claims, 15 Drawing Sheets

Related U.S. Application Data

(60) Provisional application No. 61/665,538, filed on Jun. 28, 2012, provisional application No. 61/645,270, filed on May 10, 2012, provisional application No. 61/534,441, filed on Sep. 14, 2011.

(51) Int. Cl.
*H04W 4/80* (2018.01)
*H04L 29/06* (2006.01)

(56) References Cited

U.S. PATENT DOCUMENTS

| | | | |
|---|---|---|---|
| 7,065,156 B1* | 6/2006 | Kuchi | H04B 7/0671 375/299 |
| 8,190,438 B1* | 5/2012 | Nelissen | G10L 21/00 381/85 |
| 8,281,145 B2* | 10/2012 | Rasti | H04L 63/0421 705/64 |
| 2002/0128826 A1* | 9/2002 | Kosaka | G10L 15/02 704/211 |
| 2006/0062389 A1* | 3/2006 | Mukherjee | H04L 9/0637 380/256 |
| 2007/0116277 A1* | 5/2007 | Ro | H04N 7/167 380/201 |
| 2010/0194862 A1* | 8/2010 | Givon | G03H 1/268 348/49 |
| 2011/0139874 A1* | 6/2011 | Fu | H04N 1/32122 235/462.01 |

\* cited by examiner

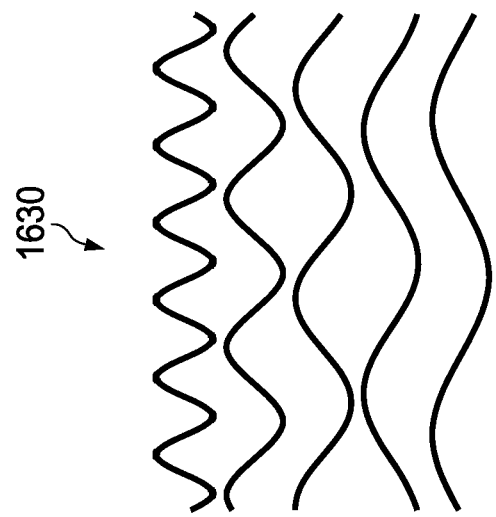
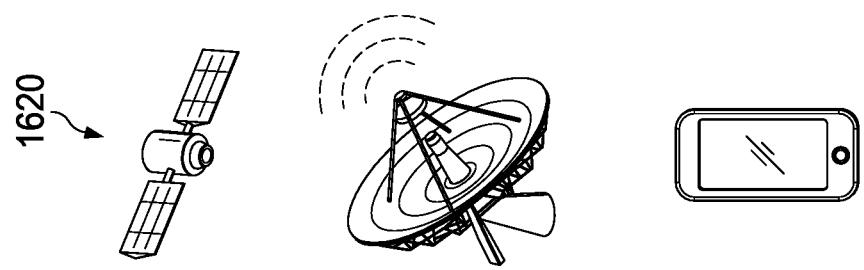
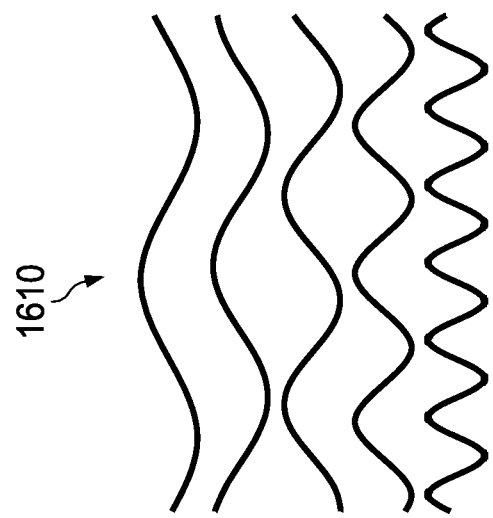
FIG. 16

SYSTEMS AND METHODS OF MULTIDIMENSIONAL ENCRYPTED DATA TRANSFER

CROSS-REFERENCE TO RELATED APPLICATION

This application is a continuation in part of U.S. patent application Ser. No. 13/619,005 filed on Sep. 14, 2012, which claims benefit to U.S. provisional patent application Ser. No. 61/534,441, filed on Sep. 14, 2011, Ser. No. 61/645,270, filed on May 10, 2012, and Ser. No. 61/665,538, filed on Jun. 28, 2012, which are incorporated by reference herein.

TECHNICAL FIELD

The present disclosure is generally related to data transfer and, more particularly, is related to multidimensional encrypted data transfer.

BACKGROUND

Data transmission, digital transmission, or digital communications is the physical transfer of data (a digital bit stream) over a point-to-point or point-to-multipoint communication channel. Examples of such channels are copper wires, optical fibers, wireless communication channels, and storage media. The data are represented as an electromagnetic signal, such as an electrical voltage, radiowave, microwave, or infrared signal.

While analog transmission is the transfer of a continuously varying analog signal, digital communications is the transfer of discrete messages. The messages are either represented by a sequence of pulses by means of a line code (baseband transmission), or by a limited set of continuously varying wave forms (passband transmission), using a digital modulation method. The passband modulation and corresponding demodulation (also known as detection) may be carried out by modem equipment, for example. According to a common definition of a digital signal, both baseband and passband signals representing bit-streams are considered as digital transmission, while an alternative definition only considers the baseband signal as digital, and passband transmission of digital data as a form of digital-to-analog conversion.

Transmitted data may be digital messages originating from a data source, for example a computer or a keyboard. It may also be an analog signal such as a phone call or a video signal, digitized into a bit-stream, for example, using pulse-code modulation (PCM) or more advanced source coding (analog-to-digital conversion and data compression) schemes. This source coding and decoding may be carried out by codec equipment.

Data transmission is utilized in computers in computer buses and for communication with peripheral equipment via parallel ports and serial ports such us RS-232 (1969), Firewire (1995) and USB (1996). The principles of data transmission have also been utilized in storage media for error detection and correction since 1951. Data transmission is also utilized in computer networking equipment such as modems (1940), local area networks (LAN) adapters (1964), repeaters, hubs, microwave links, wireless network access points (1997), etc.

In telephone networks, digital communication is utilized for transferring many phone calls over the same copper cable or fiber cable by means of Pulse code modulation (PCM), i.e. sampling and digitization, in combination with Time division multiplexing (TDM) (1962). Telephone exchanges have become digital and software controlled, facilitating many value added services. For example the first Automatic Cross-Connection Equipment (AXE) telephone exchange was presented in 1976. Since late 1980s, digital communication to the end user has been possible using Integrated Services Digital Network (ISDN) services. Since the end of 1990s, broadband access techniques such as ADSL, Cable modems, fiber-to-the-building (FTTB) and fiber-to-the-home (FTTH) have become wide spread to small offices and homes. The current tendency is to replace traditional telecommunication services by packet mode communication such as IP telephony and IPTV.

Transmitting analog signals digitally allows for greater signal processing capability. The ability to process a communications signal means that errors caused by random processes can be detected and corrected. Digital signals can also be sampled instead of continuously monitored. The multiplexing of multiple digital signals is much simpler than the multiplexing of analog signals.

Because of all these advantages, and because recent advances in wideband communication channels and solid-state electronics have allowed scientists to fully realize these advantages, digital communications has grown quickly. Digital communications is quickly edging out analog communication because of the vast demand to transmit computer data and the ability of digital communications to do so. The digital revolution has also resulted in many digital telecommunication applications where the principles of data transmission are applied, such as cryptography.

In cryptography, encryption is the process of transforming information (referred to as plaintext) using an algorithm (called a cipher) to make it unreadable to anyone except those possessing special knowledge, usually referred to as a key. The result of the process is encrypted information (in cryptography, referred to as ciphertext). The reverse process, i.e., to make the encrypted information readable again, is referred to as decryption (i.e., to make it unencrypted). In many contexts, the word encryption may also implicitly refer to the reverse process, decryption e.g. "software for encryption" can typically also perform decryption.

Encryption has long been used by militaries and governments to facilitate secret communication. It is now commonly used in protecting information within many kinds of civilian systems. For example, the Computer Security Institute reported that in 2007, 71% of companies surveyed utilized encryption for some of their data in transit, and 53% utilized encryption for some of their data in storage. Encryption can be used to protect data "at rest", such as files on computers and storage devices (e.g. USB flash drives). In recent years there have been numerous reports of confidential data such as customers' personal records being exposed through loss or theft of laptops or backup drives. Encrypting such files at rest helps protect them should physical security measures fail. Digital rights management systems which prevent unauthorized use or reproduction of copyrighted material and protect software against reverse engineering (see also copy protection) are another somewhat different example of using encryption on data at rest.

Encryption is also used to protect data in transit, for example data being transferred via networks (e.g. the Internet, e-commerce), mobile telephones, wireless microphones, wireless intercom systems, Bluetooth devices and bank automatic teller machines. There have been numerous reports of data in transit being intercepted in recent years.

Encrypting data in transit also helps to secure it as it is often difficult to physically secure all access to networks.

Encryption, by itself, can protect the confidentiality of messages, but other techniques are still needed to protect the integrity and authenticity of a message; for example, verification of a message authentication code (MAC) or a digital signature. Standards and cryptographic software and hardware to perform encryption are widely available, but successfully using encryption to ensure security may be a challenging problem. A single slip-up in system design or execution can allow successful attacks. Sometimes an adversary can obtain unencrypted information without directly undoing the encryption. There are heretofore unaddressed needs with previous solutions in providing multiple audio streams with a video stream from a transport stream.

SUMMARY

Example embodiments of the present disclosure provide systems of multidimensional encrypted data transfer. Briefly described, in architecture, one example embodiment of the system, among others, can be implemented as follows an encoder configured to receive a data stream and encode the data stream in a multidimensional data structure; and a transmitter configured to transmit the multidimensional data structure.

Embodiments of the present disclosure can also be viewed as providing methods for multidimensional encrypted data transfer. In this regard, one embodiment of such a method, among others, can be broadly summarized by the following steps: receiving a stream of data; encoding the stream of data into a multidimensional data structure; and transmitting the multidimensional data structure.

Embodiments of the present disclosure can also be viewed as providing methods for multidimensional encrypted data transfer. In this regard, one embodiment of such a method, among others, can be broadly summarized by the following steps receiving a multidimensional data structure; and decoding the multidimensional data structure into a stream of data.

BRIEF DESCRIPTION OF THE DRAWINGS

FIG. 16 is a system diagram of an example embodiment of relay station equipment used in transceiving using multidimensional encrypted data transfer.

DETAILED DESCRIPTION

Figure 1:
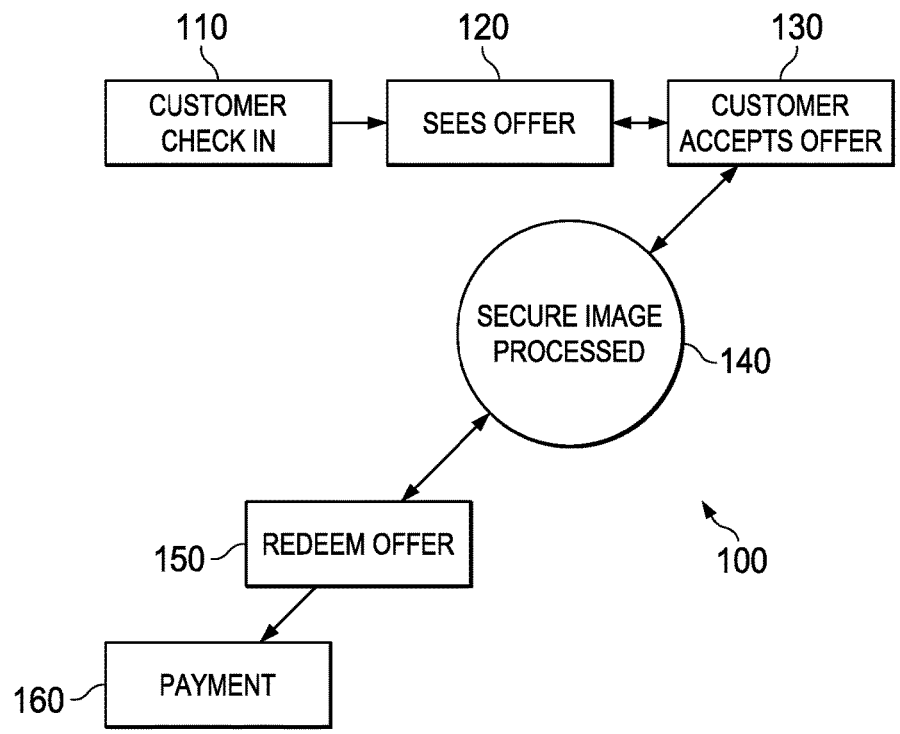
FIG. 1 is a flow diagram of an example embodiment of an example embodiment of a method of transaction using an example embodiment of multidimensional encrypted data transfer.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Near field communication (NFC) is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag". NFC builds upon RFID systems by allowing two-way communication between endpoints, where earlier systems such as contactless smart cards were one-way only. Since unpowered NFC "tags" can also be read by NFC devices, it is also capable of replacing earlier one-way applications.

NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered. A patent licensing program for NFC is currently under development by Via Licensing Corporation, an independent subsidiary of Dolby Laboratories. A public, platform-independent NFC library is released under the free GNU Lesser General Public License by the name libnfc.

NFC tags contain data and are typically read-only, but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags that provide different communication speeds and capabilities in terms of configurability, memory, security, data retention and write endurance. Tags currently offer between 96 and 4,096 bytes of memory.

As with proximity card technology, near-field communication uses magnetic induction between two loop antennas located within each other's near field, effectively forming an air-core transformer. It operates within the globally available and unlicensed radio frequency ISM band of 13.56 MHz. Most of the RF energy is concentrated in the allowed ±7 kHz bandwidth range, but the full spectral envelope may be as wide as 1.8 MHz when using ASK modulation. Theoretical working distance with compact standard antennas is up to 20 cm, but practical working distance is only about 4 centimeters. NFC supports data rates of 106, 212, or 424 kbit/s (the bit rate 848 kbit/s is not compliant with the standard ISO/IEC 18092).

There are two NFC communication modes, passive and active. In passive communication mode, the initiator device provides a carrier field and the target device answers by modulating the existing field. In this mode, the target device may draw its operating power from the initiator-provided electromagnetic field, thus making the target device a transponder. In active communication mode, both initiator and target device communicate by alternately generating their own fields. A device deactivates its RF field while it is waiting for data. In this mode, both devices typically have power supplies.

Although the communication range of NFC is limited to a few centimeters, NFC alone does not ensure secure communications. NFC offers no protection against eavesdropping and can be vulnerable to data modifications. Applications may use higher-layer cryptographic protocols (e.g., SSL) to establish a secure channel. Other security issues include relay attack, lost property, and a walk-off.

In eavesdropping, the RF signal for the wireless data transfer can be picked up with antennas. The distance from which an attacker is able to eavesdrop the RF signal depends on numerous parameters, but is typically a small number of meters. Also, eavesdropping is highly affected by the communication mode. A passive device that doesn't generate its own RF field is much harder to eavesdrop on than an active device.

In data modification. it is relatively easy to destroy data by using an RFID jammer. There is no way currently to prevent such an attack. However, if NFC devices check the RF field while they are sending, it is possible to detect attacks. It is much more difficult to modify data in such a way that it appears to be valid to users. To modify transmitted data, an intruder has to deal with the single bits of the RF signal. The feasibility of this attack, (i.e., if it is possible to change the value of a bit from 0 to 1 or the other way around), is, amongst others, subject to the strength of the amplitude modulation. If data is transferred with a modified Miller coding and a modulation of 100%, only certain bits can be modified. A modulation ratio of 100% makes it possible to eliminate a pause of the RF signal, but not to generate a pause where no pause has been. Thus, only a 1 that is followed by another 1 might be changed. Transmitting Manchester-encoded data with a modulation ratio of 10% permits a modification attack on all bits.

In a relay attack, the adversary has to forward the request of the reader to the victim and relay back its answer to the reader in real time, in order to carry out a task pretending to be the owner of the victim's smart card. This is similar to a Man-in-the-Middle Attack. One libnfc code example demonstrates a relay attack using only two stock commercial NFC devices. It has also been shown that this attack can be practically implemented using only two NFC-enabled mobile phones.

Losing the NFC RFID card or the mobile phone will open access to any finder and act as a single-factor authenticating entity. Mobile phones protected by a PIN code act as a single authenticating factor. A way to defeat the lost-property threat requires an extended security concept that includes more than one physically independent authentication factor.

Lawfully opened access to a secure NFC function or data is protected by time-out closing after a period of inactivity. Attacks may happen despite provisions to shut down access to NFC after the bearer has become inactive. The known concepts described primarily do not address the geometric distance of a fraudulent attacker using a lost communication entity against lawful access from the actual location of the registered bearer. Additional features to cover such an attack scenario dynamically shall make use of a second wireless authentication factor that remains with the bearer in case of the lost NFC communicator.

Example embodiments of the systems and methods of multidimensional encrypted data transfer address many of these inadequacies to provide communications by providing a secure image facilitating the transaction of data. The delivery of data may be from one device to another device, electronically, by Wi-Fi or Bluetooth for example. Data may be transmitted from one mobile device to another mobile device, from a mobile device to some other type of device, or between two non-mobile devices, as non-limiting examples such that there is a data packet that is generated (which may be generated in real time). In an example embodiment, transmission of the multidimensional encrypted data may occur via a coherent photon source, non-coherent photon source, or both (in conjunction). In an alternative embodiment, transmission of the multidimensional encrypted data may occur via a coherent or non-coherent sound wave source or both (in conjunction). In yet another embodiment, transmission of the multidimensional encrypted data may occur by coherent photon and coherent sound wave sources, together.

The data may be provided from multiple sources. The data may be received from a number of different streams and encoded in one data packet (or data stream) and that data packet may be presented in a multi-dimensional code.

Limitations of wireless implementations today may involve requiring specific hardware to receive a 1D or a 2D barcode, for example, such as a scanner with an assigned platform. If the appropriate hardware or software is not present on one or both devices, the transmission will fail. A hardware to hardware implementation, such as NFC, involves a chip embedded in a device, the chip having data stored in it. When the devices are within range, the data is transferred. Problems with NFC communications have been previously provided.

There are many one and two-dimensional bar coding systems, currently available, and on the market today. The one- and two-dimensional bar codes used in these systems are limited as to the amount of data transmission capabilities—with only as much as 3 kilobytes stored (represented) by the most advanced of the two-dimensional bar codes. These existing bar codes may be represented by a single, static code, and/or be scanned by a bar code reading device. Because of the limited amount of data that can be stored in a single, static, one- or two-dimensional code, these codes are not useful for the storage of smaller documents (in the tens to hundreds of kilobytes of information) to large documents (in the thousands to millions of kilobytes), image files, video or sound files. Existing one- and two-dimensional bar codes and bar code systems are also significantly limited as to potential transactional uses, such as representing the price or identification code of an individual item. Complex transactions, information exchanges, large data file storage and the portability of large amounts of data in a single bar code, are not possible with existing one- and two-dimensional bar codes and bar code systems. Also, existing one- and two-dimensional codes are extremely limited as to their data encryption abilities.

Example embodiments of the systems and methods of multidimensional encrypted data transfer disclosed herein may dramatically increase the amount of data that may be stored by existing two-dimensional bar code formats. Example embodiments of the systems and methods of multidimensional encrypted data transfer disclosed herein also introduce novel and unobvious methods to store and access bar code information. Further, example embodiments of the systems and methods of multidimensional encrypted data transfer disclosed herein describe novel uses, applications and systems pertaining to one-, two-, three-, four-, and more dimensional data structures. Example embodiments of the systems and methods of multidimensional encrypted data transfer disclosed herein also geometrically and—in certain embodiments—exponentially enhance data encryption ability and capacity.

In example embodiments of the systems and methods of multidimensional encrypted data transfer disclosed herein, at least one additional dimension is added to a 2D data structure. For example, data may be encoded within multiple facets. Example embodiments of the multidimensional encoding include non-limiting examples of stacking or providing images or tiles in a very short period of time and moving a 3-dimensional object in space. Barcodes represent a convenient point of reference. However, an image, whether rapidly changing in color, conformation and intensity, for instance) may be comprised, as non-limiting examples, of colored squares or colored dots of various shapes and sizes or thousands of squiggly lines or images of colored widgets (to which specific data values may have been assigned). Example embodiments of the systems and methods of multidimensional encrypted data transfer involve the dynamic, rapid, randomized nature of the multidimensional data structure.

In one example application, a number (for example, one hundred) of distinct patterns of colored geometric shapes are presented over a time period (for example, a second), in a .gif file, for example. The encoded data size provided in the .gif file is dramatically increased. In another example, the colors of the tiles in the mosaic of colored geometric shapes may also be shifted over time. A standard initiation frame or code signifies the beginning of the data. The reader application will look for this particular initiation. In an example embodiment, there may be a fail-safe check so that the receiver verifies the transmission and the sender confirms and starts sending data. Error-checking may also be included. Any file that allows animation can be used, such as a .gif, .avi, .mpeg, .mpg, .mp3, and .mp4 file among others. An encoder generates the multi-dimensional code and the decoder changes it back into usable data.

Example embodiments of the systems and methods of multidimensional encrypted data transfer disclosed herein may be used by a broad spectrum of individuals, organizations, businesses and industries—including, but not limited to: brick-and-mortar and Internet-based ("online") retail stores, retail customers, health care systems and independent hospitals, patients, doctors, medical clinics, veterinarians, pet owners, livestock owners, crop growers and food producers, grocery stores, shippers, allied transportation industries, Department of Defense and other defense agencies, Federal Emergency Management Agency, Centers for Disease Control, United Nations, NATO, Medicins sans Frontiere/Doctors Without Borders, International Red Cross, other national and international aid organizations, banks and other financial institutions among others.

Users may benefit from greatly enhanced ability to capture, store and present data, for all kinds of file transactions—whether text, image, video, sound, or other file types—in a manner that is more secure, portable, seamless, and inexpensive than is possible with existing types and combinations of contactless technologies.

Example embodiments of the systems and methods of multidimensional encrypted data transfer disclosed herein may play a key role in the facilitation of transactional processes of everyday modern Business methods, procedures, protocols and systems. These methods, procedures, protocols and systems include, but are not limited to: capacity management, queuing management, monetary and financial management, warehousing, distribution management, inventory control, parts management, storage management, supply chain management, process improvement, quality assurance management, total quality management, packaging science and management, traffic control and management, hospital, medical and clinical science (and management and their facilities), airline science and management, engineering sciences, life sciences, biological sciences, zoological sciences, animal management and husbandry, food science, and general science, among others.

Potential industry segments that will measurably benefit from—and for which there are novel applications of—example embodiments of the systems and methods of multidimensional encrypted data transfer disclosed herein can may include, but are not limited to: Government, Finance, Insurance, Health Care (such as medical clinics and practitioners, hospitals, healthcare systems, PPOs and HMOs), Agriculture, Energy Grid, Food, Beverages, Biotech, Engineering, Retail (of any kind), Commercial Fishing and Fish Hatcheries, Transportation, and Emergency Response/Emergency Management, and Environmental Monitoring/Management, among others.

An industry example that may show immediate and great benefit, using example embodiments of the systems and methods of multidimensional encrypted data transfer disclosed herein, is emergency rooms of Hospitals and Medical clinics especially in the encoding of electronic health records (EHR). The use of example embodiments of the systems and methods of multidimensional encrypted data transfer disclosed herein would substantially facilitate the management of multiple processes of an emergency room. Example embodiments of the systems and methods of multidimensional encrypted data transfer disclosed herein will aid in managing the capacity as well as the queuing of patients prior to ingress, during their medical evaluation and treatment process and upon egress, of the facility.

In an example embodiment of multi-dimensional data transfer (two-, or more, dimensional data structures may be presented on various surfaces—including, but not limited to: papers, plastics, metals, rubber, cloth and leather surfaces, as well as computer screens, tablet PC screens, POS device screens, two-dimensional and three-dimensional cellular phone screens, personal digital assistants (PDA)—which can be liquid crystal displays, LED, thermal, photovoltaic, and other display technologies—in rapid succession (or one right after the other), of two or more distinct and separate data structures, and the sum total of the data presented in these codes is to be read by a device (such as a non-limiting example of a laser and infrared reader) containing a decoder application or other code reader technology as a single data packet. The means by which the data structure displays may be attached to these various surfaces include, but are not limited to: gluing, riveting, sewing and/or some combination of these methods.

This will have the effect of, and render, the multiplying of data captured, stored, read and shared (or transacted). Example embodiments disclosed herein include the reading of each surface of any given geometric shape, (cubes, tetrahedrons, etc., nearing an infinite number of geometries and surfaces) with each surface defined and consisting of a rapid succession of one packet of data (as explained previously). Example embodiments of the multidimensional data structures include simple geometries as well as special, topological shapes, such as, but not limited to, a Mobius loop, a trefoil knot, a torus, fractal geometry, or a continuous deformation (a homeomorphism). It is advantageous that the data structures have the ability to change with time, at any given moment, or on-the-fly. More data may be stored by manipulating the way in which multi-dimensional data structures are presented, as embedded within or being read through lenticular prisms, for example. These prisms may also be rendered in two or more intersecting directions, such that scanning of the bar codes through the lenticular prisms could store and present two or more times more data than the same one- and two-dimensional data structures stored and presented without the addition of the prisms. These lenticular prisms may also be combined with polarization, colorization and changing of depth of field, for example, of the substrate material in which the data structure is embedded, or through which the data structure is presented.

Another example embodiment introduces the creation of three-dimensional data structures as holographic representations of a geometrical object, including but not limited to such geometries as spheres, cubes, cuboids, ellipsoids, pyramids, tetrahedrons, cylinders, cones and octahedrons, with one or more surface projections, having flat or curved surfaces, capable of representing unique data sets and of being read by one or more optical reading sources. When in the midst of assembly—during data storage—these multi-dimensional data structures may have many projections on their surfaces. Whether these multidimensional holographic objects are stationary or in motion, their surface projections become readable data surfaces. The number of surfaces and surface projections increases the amount of data that may be stored, certainly geometrically and, potentially, exponentially. Thus, a unique ramification of this embodiment is the introduction of four-dimensional data structures, which are created when said three-dimensional data structures are made to move or spin in some manner, adding the dimension of time—including, but not limited to: a jiggling or bobbing motion, spinning on a single axis, spinning on two or more axes at the same time, spinning in a clockwise direction, spinning in a counter-clockwise direction, spinning at a constant rate, spinning at a variable rate, pulsed spinning, intermittent spinning, changes in the conformation, variation of holographic object color and object surface projection color and/or polarization or other filtering of the holographic image, among others.

Another example embodiment introduces the element of color changes, over time, on one or more surface of a multidimensional data structure—with the colors varying in hue, saturation, shape and pattern—and these color changes may represent changes in the data being encoded and decoded, for example. The colors may appear as random blocks or other shapes, and also may appear as familiar shapes or parts of familiar shapes. The colors and their shapes may represent specific data sets and these data sets may be assigned "on-the-fly" or may be determined in advance—as a data set table. These color elements of the multidimensional codes may be added to other encoding embodiments and may be free-standing—separate—forms of encoding and decoding data.

In yet another example embodiment, the element of sound may be introduced to the coding. As discussed in the introduction, current barcode technologies cannot be encoded with enough data to represent a sound file. However, in this example embodiment of the multidimensional data structures, the data may be encoded as a sound file and decoded as an image; may be encoded as an image and decoded as sound; and may be encoded as sound and decoded as sound. The encoding application may encode data in the packet as pulsed, as musical notes and as other sound forms—that may be audible to human hearing, may be ultralow frequency and inaudible to human hearing, and may be ultrahigh frequency and inaudible to human hearing. This sound element of the multidimensional data structure may be added to other encoding embodiments and may be a free-standing—separate—form of encoding and decoding data.

In an example embodiment, patients en route to an emergency room or other urgent care facility, who have access to a mobile smart device—as well as patients accompanied by another person with access to a mobile smart device—could access, execute and open a queuing program application (a software application), enter the patients' information, symptoms, location, and the fact that they are on their way to the ER, for example. Then, depending on the extent and severity of the injury, disease, or wound, this could help to create a new type, or style, of triage called "self-triage." Patients can choose to navigate the software application by themselves or can select the option to have an animated or "live-action" avatar guide them through the self-triage, self-check-in process. In an example embodiment of the systems and methods of multidimensional encrypted data transfer disclosed herein, the codes and reading devices are integrated as a system, whereby computing devices—such as desktop, laptop and tablet PCs, so-called smart phones and other cellular technologies—may play a role in the receiving, storage, distribution, manipulation, computation, resolution of data, and the rendering of the solutions needed to complete a cycle. The data entered by the patients prior to ingress, through the use of a mobile smart device, would be sent wirelessly through modern "data servers," (Local and/or Wide Area Networks) received by the computer server located in the hospital or clinic. The medical staff could then have access to the instant data that was sent by the patient's mobile device allowing immediate "on the spot" viewing, mental computing, thinking and decision-making.

Because patients will have the option of entering enough personal identifying information, the patients' medical records may also be accessed, electronically, and securely presented to ER medical professional staff for reference and as an adjunct to patients' self-triage assessment. The patients could receive information, in text and various graphical, animated, video and auditory formats, from the hospital or clinic staff, with instructions and/or messages on their ingress into the facility, on the face of their mobile smart device. Triage, queuing, and capacity management problems of hospital ER and medical clinics, may be improved, solved, and enhanced using example embodiments of the systems and methods of multidimensional encrypted data transfer disclosed herein.

Corollary to the patients receiving information as text and/or various other graphical, animated, video and auditory formats, the multidimensional data structure may open up its own, self-generated "mini website," even in the absence of Internet access. The generation of this "off-line" website may also be triggered by an RFID handshake, Bluetooth, et al.—in other words, not necessarily multidimensional data structure generated.

Other self-contained programs may also be built into the multidimensional data structures, which may be modified as new information is integrated by the user. Furthermore, these multidimensional data structures may open up or render into other types of executable files, and not merely mini-sites, mini-movies/videos or mini-music boxes. By extension, for example embodiments of the multidimensional data structure disclosed herein, there is the inherent capacity of running whole operating systems and software platforms from these multidimensional data structure, and the software programs may be imported to the mobile device for temporary use, "as needed"; this would mean having access to a full palette of programs normally only available on a high end tablet, laptop or desktop.

In addition to the multidimensional data structures generating mini-sites, for example, within the mobile device—the mini-sites may be "permanent" until intentionally deleted from the device memory and may be self-deleting. That is to say, if the mini-site has been already been used for its primary purpose and is time-sensitive—thus, pointless to retain past a certain date/time—it may automatically erase itself from the device. A similar, self-delete feature subroutine, may also be implemented in the multidimensional coding of sensitive information, such as medical records. The multidimensional data structure may have a built-in self-destruct that auto-deletes the multidimensional data structure when someone is attempting to forcibly hack into the data. Since the multidimensional data structure may, ultimately, be reconstructed anywhere in cyberspace, and since any multidimensional data structure ERM (electronic record) data is wholly copied to email and other "storage," deleting the data from the mobile device may not delete it from everywhere. This security feature incorporated in the overall multidimensional data structure model may further protect the data, above and beyond the encrypted multidimensional data structure format.

Another aspect of this example embodiment involves myriad potential marketing and advertising opportunities, such as a discount off a certain service or the sending of mobile gift cards or coupons. A merchant may present an image that appears to be a still image but the image is actually changing at such a rate that the human eye cannot see the change. For example, a mosaic may be generated and a data stream may be encoded into changes in consecutive frames of the mosaic. Changing colors (colors in addition to black, white, and gray, such as yellow, green, blue, red, etc.) may be used to increase the data rate. The encoding/decoding may be performed using standard cryptography.

FIG. 1 provides a transactional diagram of an example embodiment of method of transaction 100 using a system of multi-dimensional data structure transfer. In block 110 a user checks in at, and not limited to, a retail facility or the like to see what offers are available. In block 120, the user views the offers that are available. In block 130, the user accepts at least one of the offers. In an example embodiment, the user has checked in with his mobile device to read one or more secure images encoded with a multidimensional encrypted data structure transfer method. In block 140, the secure image or multidimensional encrypted data structure is processed on a mobile device for example, on the user's mobile device or tablet, or the like. In block 150, the offer is redeemed and in block 160 a payment is made. All of this may be done through the user's mobile device. The mobile device or other system or device may have a reader application installed that can decode the information or data stream/file that has been encoded by one or more methods of multidimensional encrypted data structure transfer.

Figure 2:
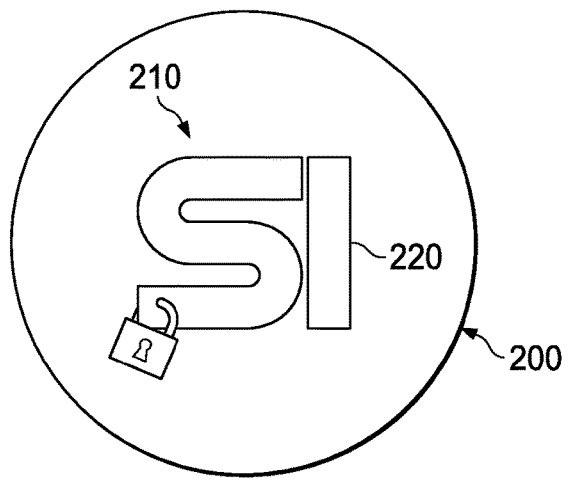
FIG. 2 is an example embodiment of an image encoded with an example embodiment of a method of multidimensional encrypted data transfer.

FIG. 2 provides image 200 which has been encoded with an example embodiment of a method of multidimensional encrypted data structure transfer. Image 200 comprises an image, which may be a word, words, string of alphanumerics or other language letters or symbols, as non-limiting examples. Image 210, may appear white to the human eye (or any other color). In an example embodiment, image 220 comprises a number of colored tiles, which, when viewed together, appear to be a single color to the human eye. However, an image processor (either hardware or software) on a mobile device, for example, can capture the individual tiles and decode them into a data stream or file.

Figure 3:
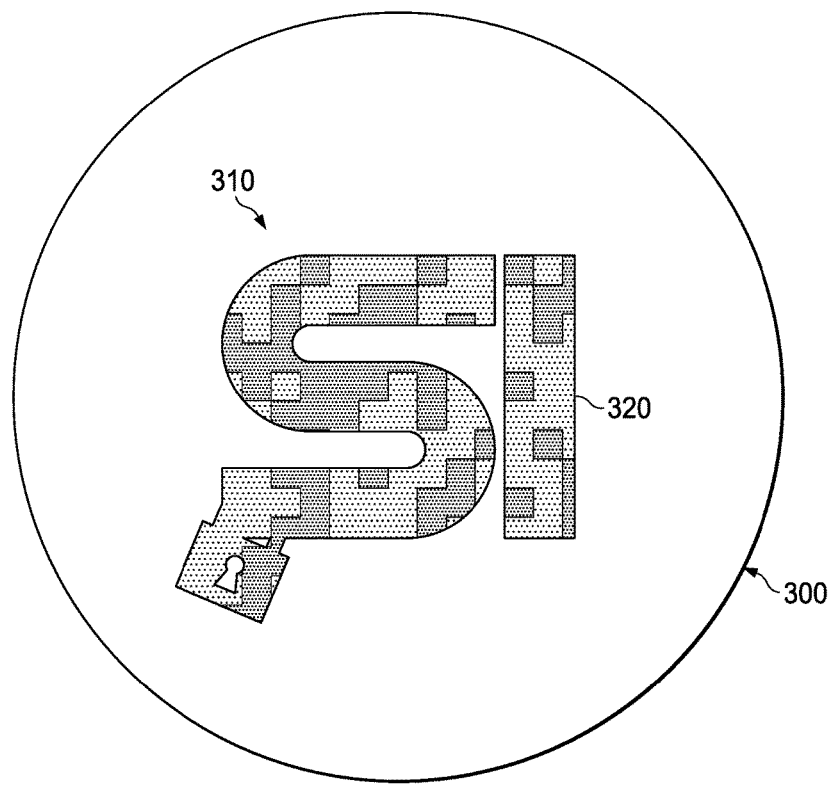
FIG. 3 is an example embodiment of the encoded image of FIG. 2.

FIG. 3 provides an example embodiment in image 300 with word, words, or other symbols 310 comprising tiles 320 embedded in word or symbol 310. In this embodiment, tiles 320 in symbol 310 have been encoded with a method of multidimensional encrypted data structure transfer to contain a data stream or file.

Figure 4:
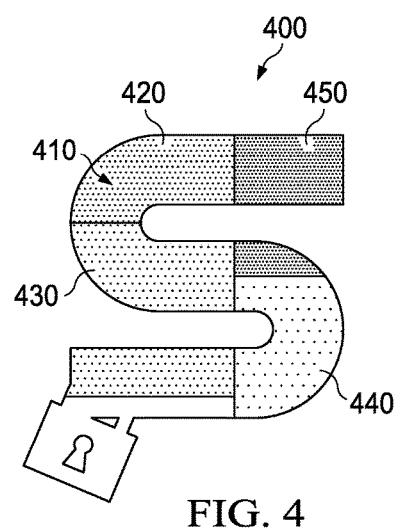
FIG. 4 is an example embodiment of a symbol of the encoded image of FIG. 3.

FIG. 4 provides example data that has been encoded into a portion of the symbol. Symbol 400 comprises inner portion 410 which has been encoded with an example embodiment of a method of multidimensional encrypted data structure transfer as disclosed herein. Inner portion 410 in this example embodiment comprises information such as driver's license 420, loyalty ID 430, offer 440, and optional area 450 for other data desired by the transactor. Although inner portion 410 is shown with four sections, it may contain any number of sections and any data desired by a transactor or other entity/user. Any signal that can be digitized (such as Multi-purpose Internet Mail Extension (MIME) data may be encoded in a multidimensional encrypted data structure.

Figure 5:
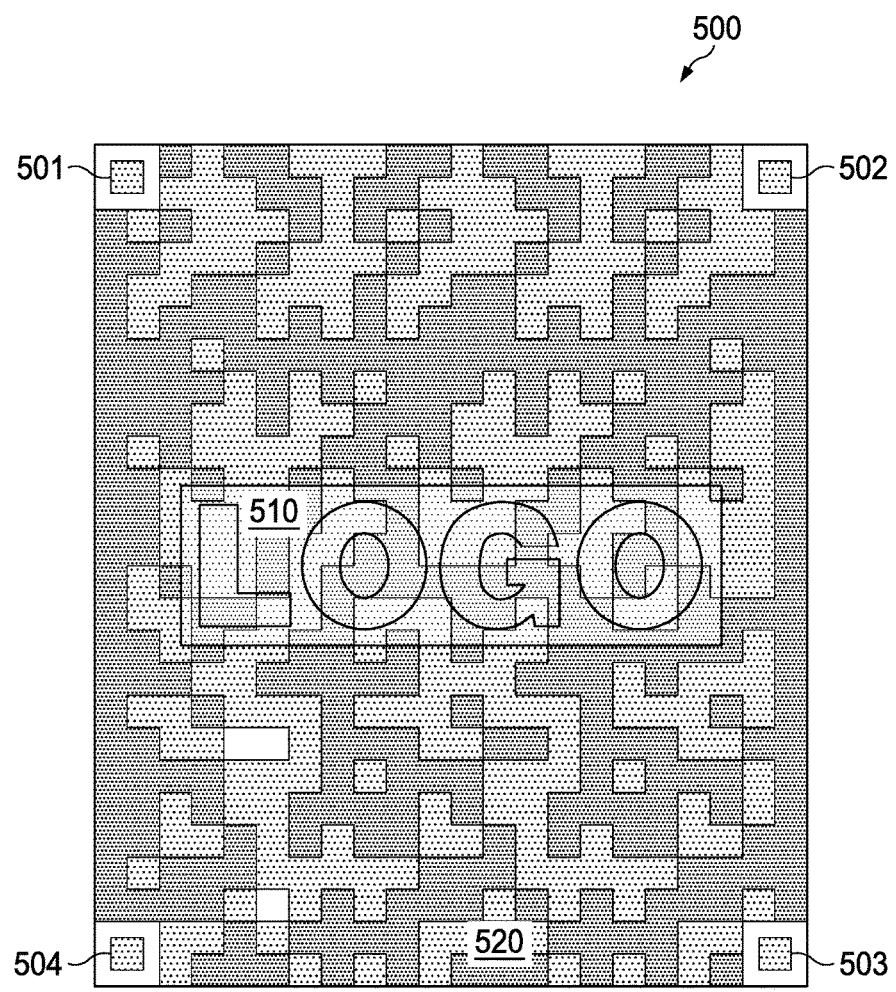
FIG. 5 is an example embodiment of a first frame of a mosaic that changes over time according to an example embodiment of a method of multidimensional encrypted data transfer.
Figure 6:
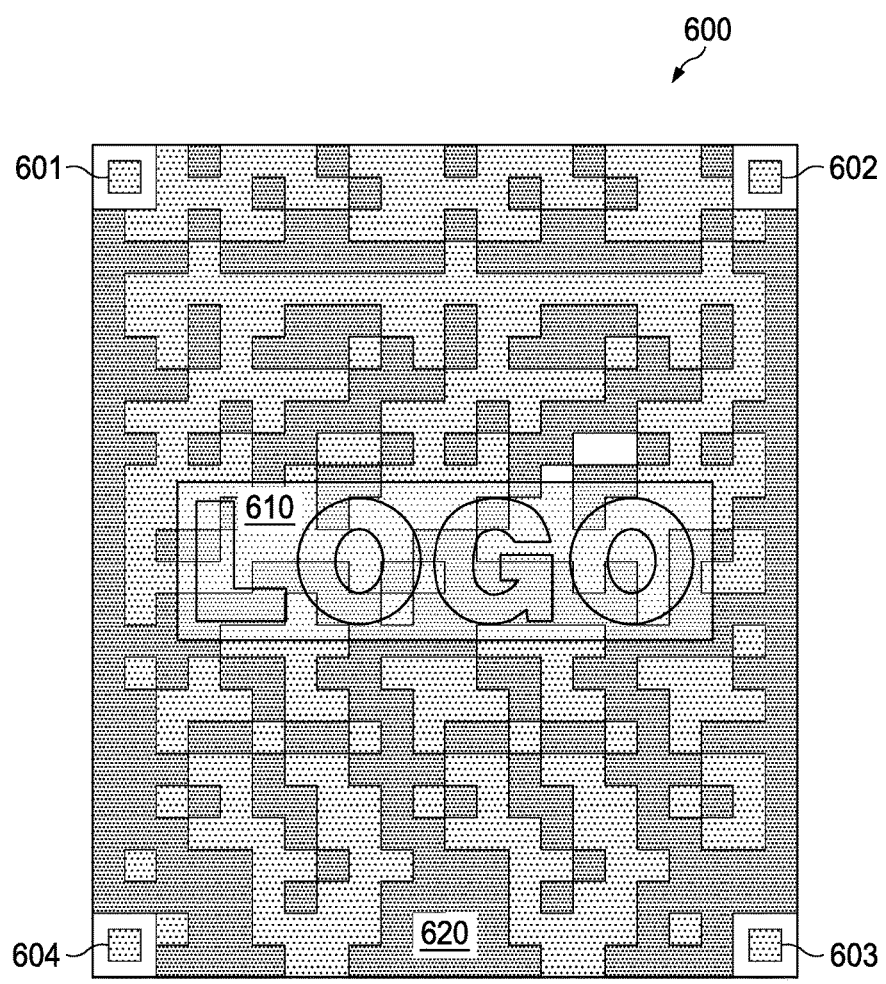
FIG. 6 is an example embodiment of a subsequent frame of a mosaic that changes over time according to an example embodiment of a method of multidimensional encrypted data transfer.
Figure 7:
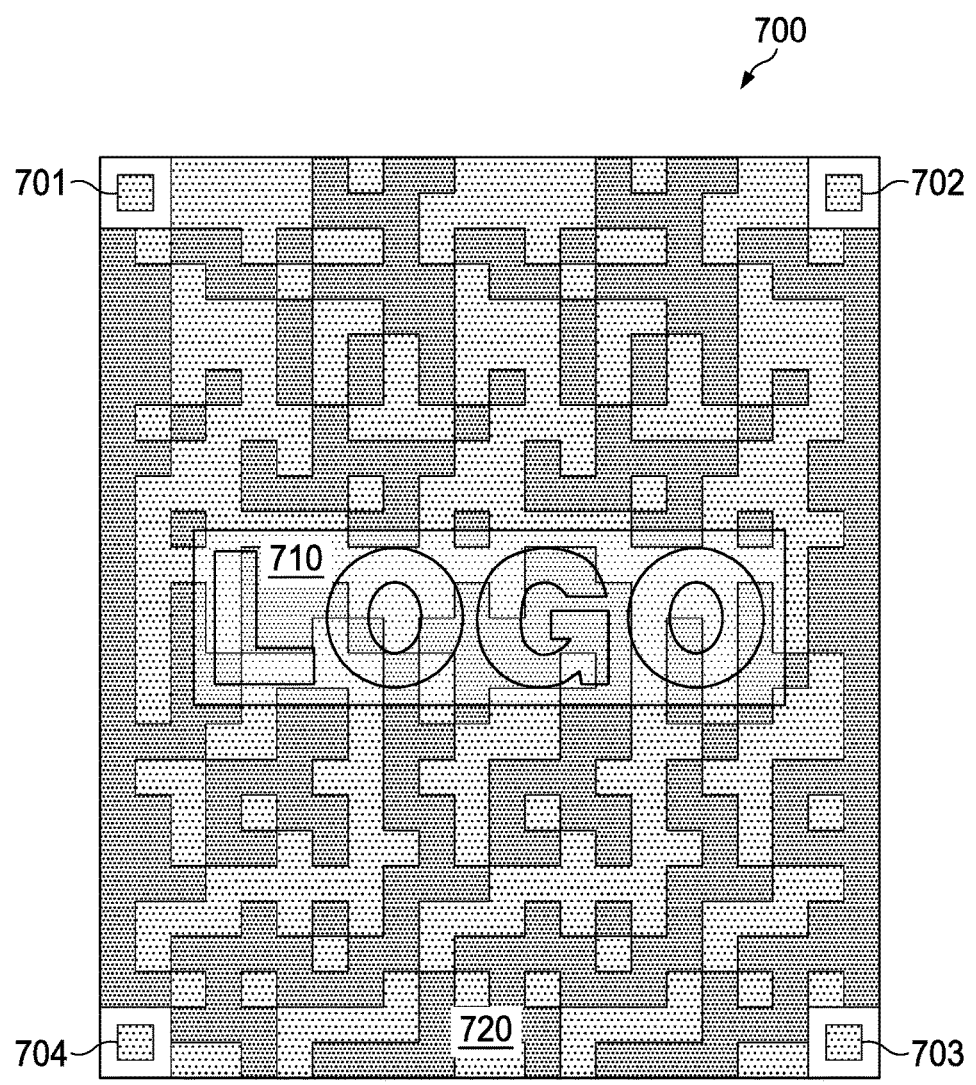
FIG. 7 is an example embodiment of a subsequent frame of a mosaic that changes over time according to an example embodiment of a method of multidimensional encrypted data transfer.
Figure 8:
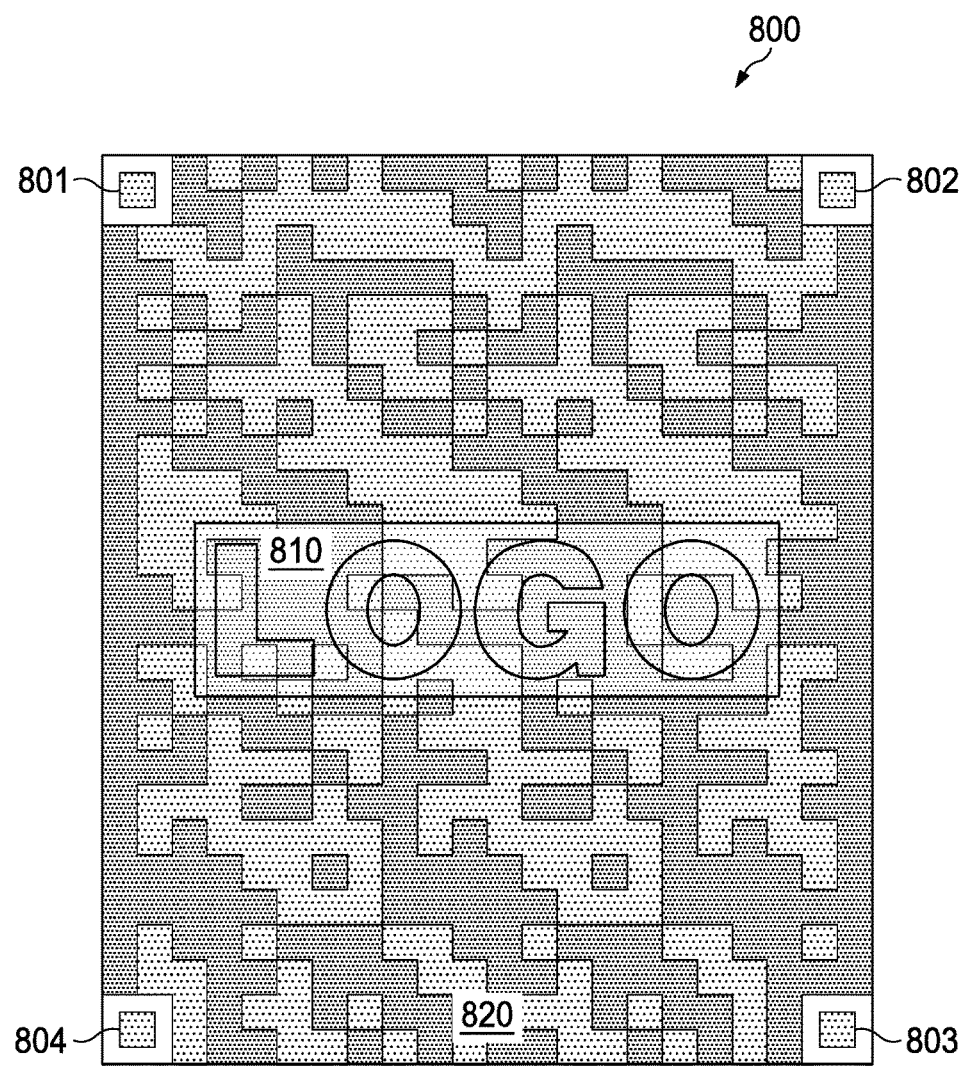
FIG. 8 is an example embodiment of a subsequent frame of a mosaic that changes over time according to an example embodiment of a method of multidimensional encrypted data transfer.

FIG. 5 provides an example embodiment of first frame 500 of an example offer, frame 500 comprising mosaic 520 with symbol 510. In the example of FIG. 5, reference points 501, 502, 503, and 504 are provided for a decoder. Four reference points are provided in this example, but the number of reference points may be dependent on many factors, including the encoding method and the discernibility of the medium and quality of the image capture device, among others. FIGS. 6, 7 and 8 provide subsequent frames 600, 700 and 800 with mosaics 620, 720 and 820 respectively, for offers with symbols 610, 710 and 810. Each frame 500, 600, 700 and 800 has a changed mosaic pattern. In an example embodiment, the shifting patterns of the mosaic may be used to represent the contents of the data stream/file.

Figure 9:
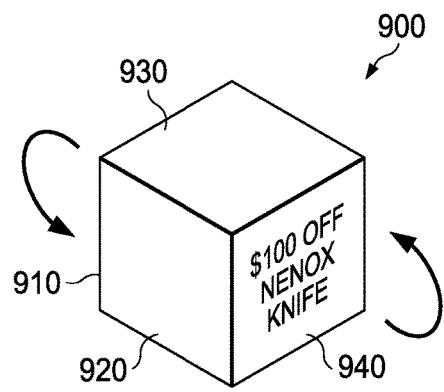
FIG. 9 is an example embodiment of a multidimensional data structure with at least 4 dimensions.

FIG. 9 provides an example embodiment of an encrypted, multidimensional data structure, as three dimensional object 900 that rotates (spins) in space—on one or more fixed or non-fixed (random) axes—lending a fourth dimension (such as time) to the structure. Cube 910 has six faces, with only three faces 920, 930, and 940 shown in FIG. 9. Each of faces 920, 930, and 940 may contain encoded and encrypted data or information, such as a loyalty ID, a driver's license number, and an incentive offer, among others. The colors imparted by the rotation may, in an example embodiment, be tied to a particular offer, personal encrypted multidimensional data structure, electronic health record (EHR), or other official data record.

Figure 10:
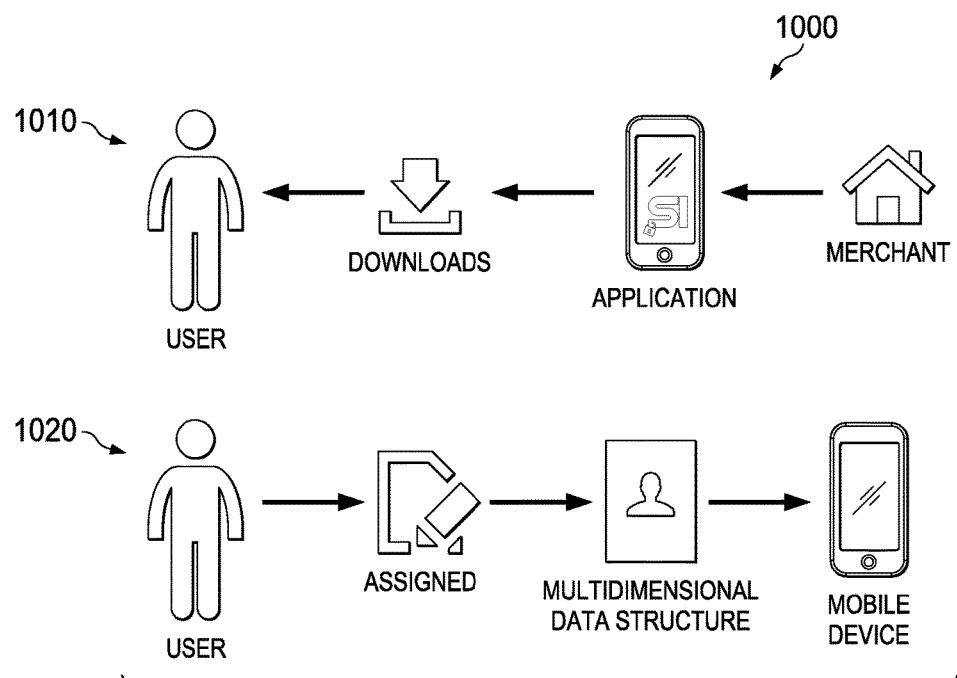
FIG. 10 is an example embodiment of a user receiving a multidimensional data structure application.

FIG. 10 provides an example embodiment of flow chart 1000 for a user receiving an application embodying a method of encrypted multidimensional data structure transfer. In step 1010, a user may download an application from a merchant, ITunes store, and Android market, or the like. In step 1020, the user may be assigned a personal encrypted multidimensional data structure for identification and for usage on a user's mobile device, for example.

Figure 11:
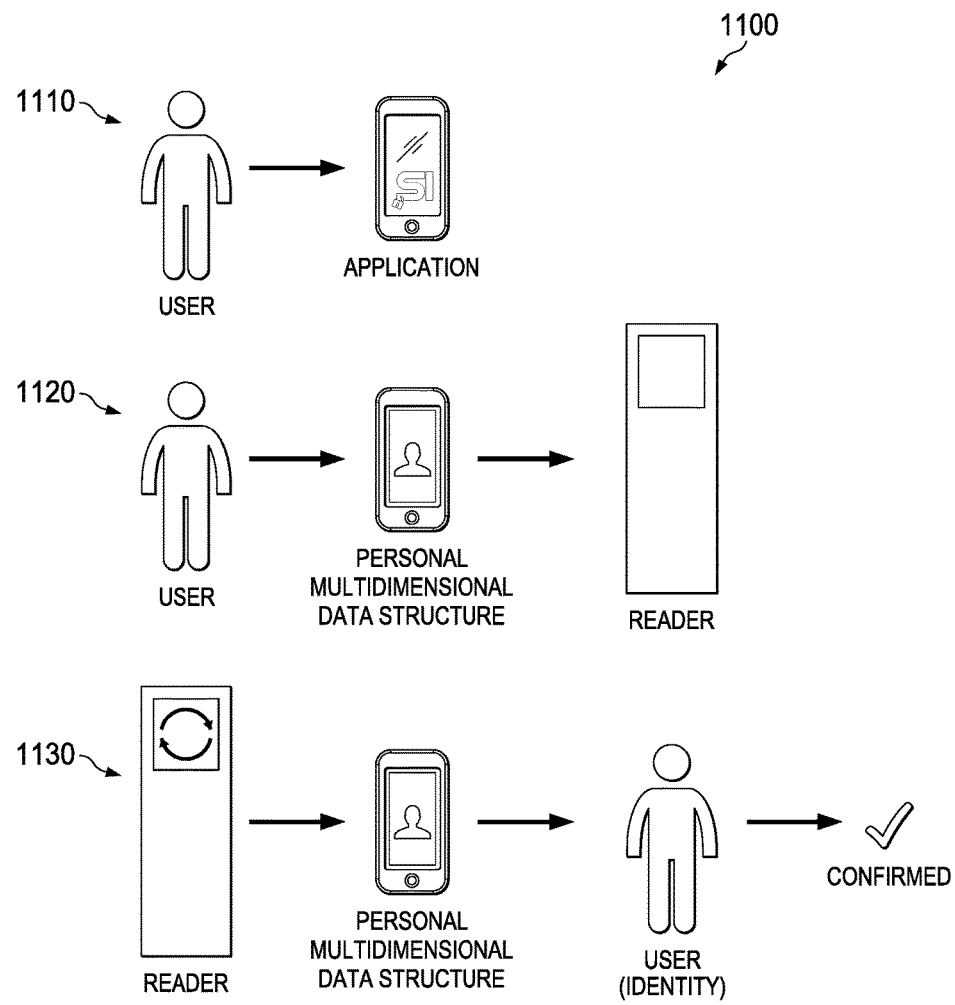
FIG. 11 is an example embodiment of a user checking in with a system using a multidimensional data structure.

FIG. 11 provides an example embodiment of flow chart 1100 of a user check-in using the personal encrypted multidimensional data structure from step 1020. In step 1110, the user may open up the application embodying the method of encrypted multidimensional data structure transfer. In step 1120, the user displays the personal encrypted multidimensional data structure on the user's mobile device to a self-service terminal or a kiosk or other device equipped with a reader and the application to decode the personal encrypted multidimensional data structure. In step 1130, the user is "checked-in" when the personal encrypted multidimensional data structure is recognized at the reader and the user's identity is confirmed.

Figure 12:
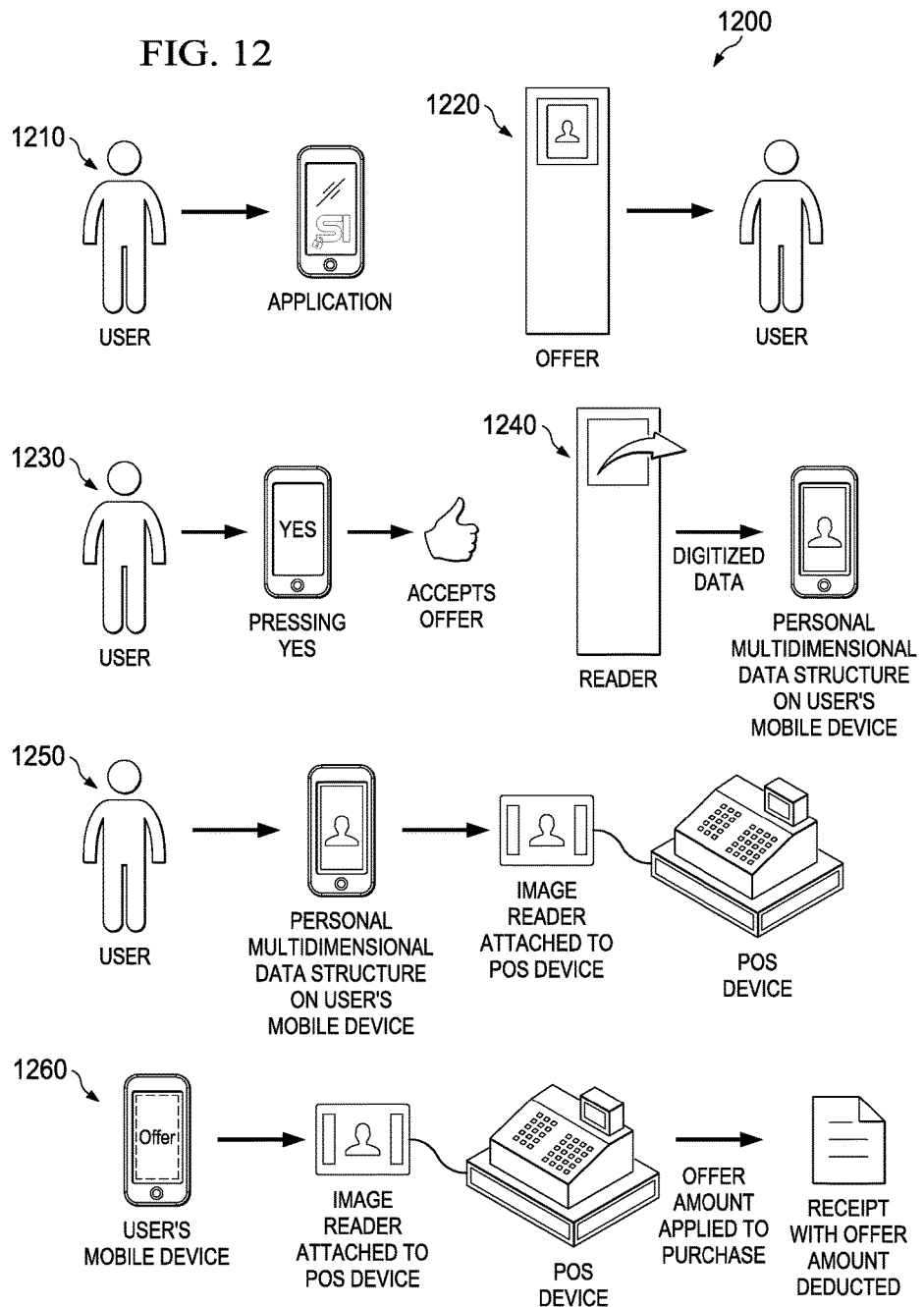
FIG. 12 is an example embodiment of an example application of a multidimensional encrypted data structure used to redeem an incentive offer.

FIG. 12 provides an example embodiment of flow chart 1200 of a user redeeming an incentive offer. In step 1210, a user opens the application on the mobile device (as a non-limiting example) for providing the personal encrypted multidimensional data structure to the reader application (for example, on a self-service terminal or a kiosk). The user may be identified which may trigger multiple events to occur, which could include but not be limited to check-in to a social media program, connection to a loyalty application, presentation of incentive offers, or the like. In step 1220, an incentive offer may be presented as an encrypted multidimensional data structure on a self-service terminal or a kiosk or some other device which can present an encrypted multidimensional data structure. The encrypted multidimensional data structure may be read and decoded by an application on the user's mobile device, for example. In step 1230, a user may accept the offer in the encrypted multidimensional data structure, for example and not limited to, pressing "YES" on their mobile device. In step 1240, digitized data for an incentive offer may be transferred from a self-service terminal or a kiosk, for example, to the user's personal encrypted multidimensional data structure application on the user's mobile device. In an example embodiment in step 1250, the user presents the personal encrypted multidimensional data structure to an image reader attached to a Point of Sale (POS) device such as a cash register, or the like. In step 1260, an incentive offer is transferred from a user's mobile device to a reader application integrated into the POS device, for example, and the incentive offer amount is applied to the purchase.

Figure 13:
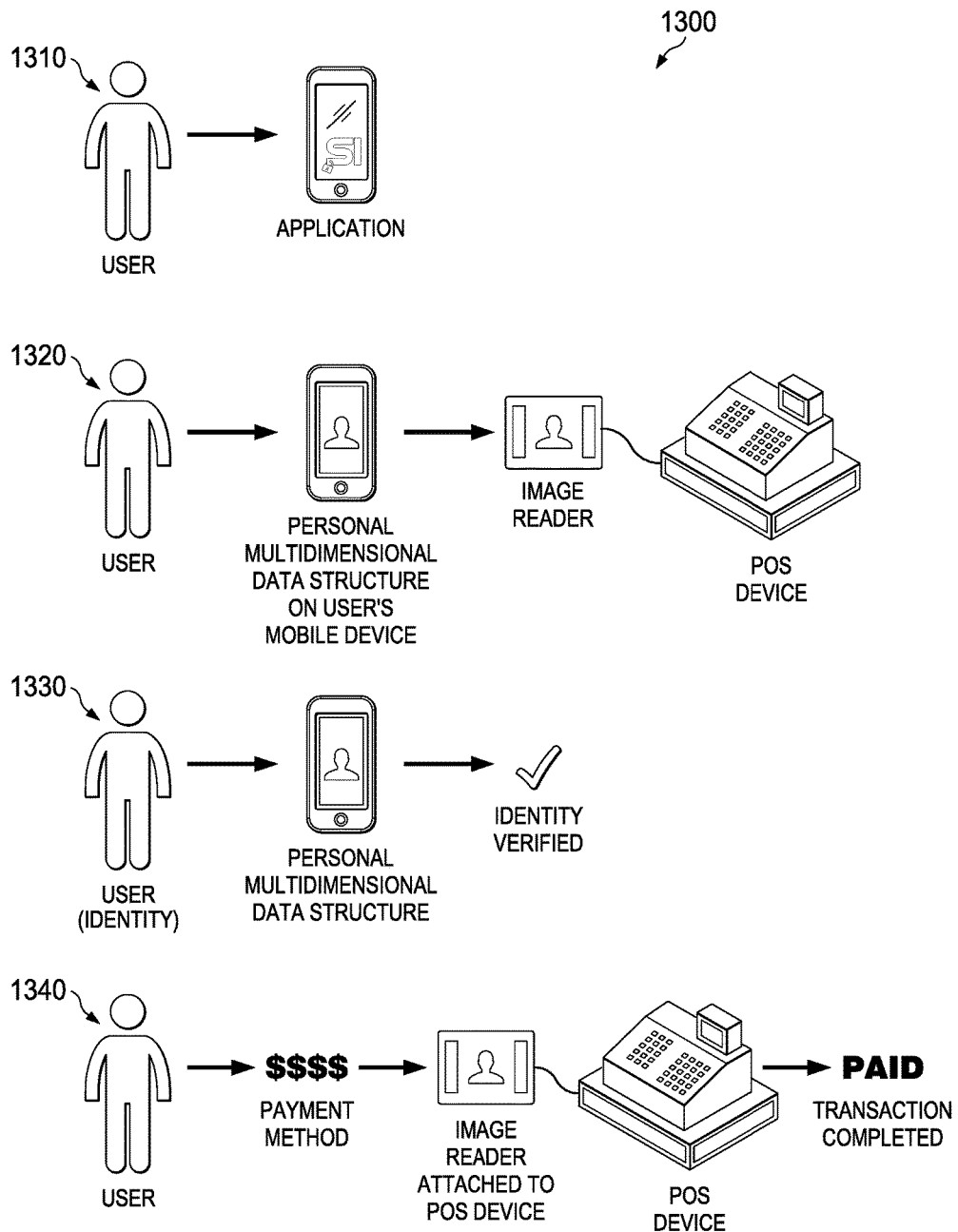
FIG. 13 is an example embodiment of making a transaction using a multidimensional data structure.

FIG. 13 provides an example embodiment of a method of transaction (as a non-limiting embodiment, a payment using loyalty currency) using a method of encrypted multidimensional data transfer as disclosed herein. In step 1310, a user opens the encrypted multidimensional data structure application on a mobile device. In step 1320, the user displays the personal encrypted multidimensional data structure on the mobile device to be read by an image reader, for example, the image reader could be, and not limited to being, attached to a POS device either wired or by wireless means. In step 1330, the user identity is confirmed from the personal encrypted multidimensional data structure. In step 1340, the user completes the payment transaction by selecting an appropriate method of payment. In an example application, the payment may be used as fiat currency by a government or business entity.

Multidimensional encrypted data transfer (MEDT) may be used in long range data communication, such as space-based data transfer and communication and other long range terrestrial applications. A non-limiting list of example communication includes communication between:

Manned and unmanned spacecraft and manned and unmanned space stations, other manmade space-based vehicles, satellites and relay stations Manned and unmanned Satellites and manned and unmanned Space Stations, other manmade, Space-based vehicles, satellites and relay stations Earth and Space-based satellites Earth and Spacecraft/other Space vehicles, both unmanned and manned Earth and Space-based stations and other manmade objects Earth and exoplanets, asteroids and other, naturally-occurring objects Exoplanets and Space-based satellites Exoplanets and Spacecraft/other Space vehicles, both unmanned and manned Exoplanets and Space-based stations and other manmade objects Exoplanets and exoplanets, asteroids and other, naturally-occurring objects Asteroids and Space-based satellites Asteroids and Spacecraft/other Space vehicles, both unmanned and manned Asteroids and Space-based stations and other manmade objects Asteroids and exoplanets, asteroids and other, naturally-occurring objects Our solar system and free Space Our solar system and other solar systems and Deep Space Relay stations may be employed to amplify the signal, re-encrypt the signal, and reprocess the data into other carrier signal types in order to minimize the data pulse duration, increase security of data, and/or optimize the method of signal delivery depending on the intended transmission medium. In an example embodiment, if the MEDT function employs multiple carrier types with varying transmission speeds (for example, sound waves and electromagnetic waves), the relay stations may modulate the data signal on the slower carrier to a higher speed carrier in order to minimize the time width of the entire ensemble of signals. This may be optimized depending on the data and the requirements for the transmission. If the data is secure data, then the focus is on encryption and carrier types are used that are more difficult to intercept such as x-ray and infrared light. If the transmission utilizes speed and bandwidth, then optimization may include more electromagnetic wave carriers. Since the each component part is used to reconstruct a substantial representation of the original data stream, the overall transmission time is important.

Relay stations may include non-limiting examples such as geo-stationary earth orbit (GEO), medium earth orbit (MEO), low earth orbit (LEO), highly elliptical orbit (HEO), La Grange or other orbital or fixed satellites or other manmade and naturally occurring space-based objects. Will be a self-healing and self-sustained Ecosystem, of various-sized and various conformations of all Ecosystem nodes—Space-based substations, Space vehicles, satellites, modules and other component objects.

Non-limiting examples of self-healing and self-sustainable aspects include (1) positional adjustment and distribution of Ecosystem nodes (modules, substations, satellites, Space vehicles and other component objects) in Space, and as deployed in orbit around other planetary bodies and lunar bodies and asteroids, and as deployed on the surface and inside of other planetary bodies and lunar bodies and asteroids; (2) redundant modules deployed in orbit, in "standby mode," designed to automatically and manually become operational in the event of an active module catastrophic failure, or module damage.

In an example embodiment, these redundant modules may already be deployed, singularly or in groups, into High Earth Orbit (HEO). In an alternative embodiment, these redundant modules may reside within a larger substation, which has been deployed into Low Earth Orbit (LEO), and may be released from inside the substation—singularly, in pairs, and in groups—and then moved into position in HEO. Back-up/redundant component parts may be incorporated within any or all modules. The back-up/redundant component parts may be designed to switch to active mode, automatically and manually, in the event of individual component part failure(s), within individual modules.

Transmission optimization may be achieved by selecting a medium dependent on the conditions. For example, when buildings or other high density obstructions are present, radio waves, gamma rays, or sound waves, among other media, may be used. When air, clouds, or other low density obstructions are present, x-rays, radio waves, and sound waves, among other media, may be used. When in a vacuum, as in space, visible light, particles, microwaves, and x-rays, among other media, may be used.

Figure 14:
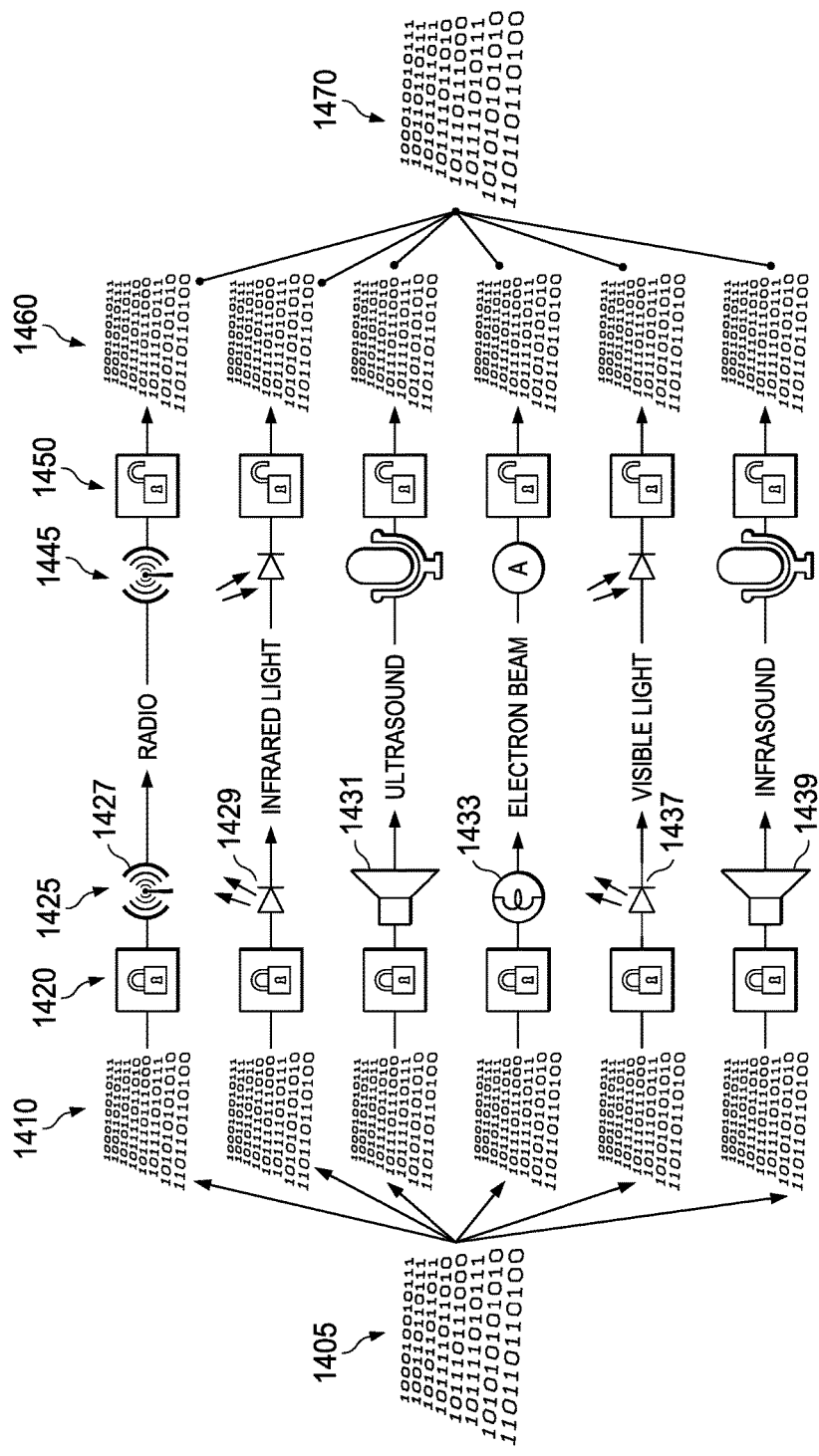
FIG. 14 is a system diagram of an example embodiment of multidimensional encrypted data transfer by various means.

FIG. 14 provides an example embodiment of multidimensional encrypted data transfer by various means. In an example embodiment, digital data 1405 is input into the system. Digital data 1405 may then be separated into data subsets 1410. All of data subsets 1410 are used to decrypt and reconstruct the data back to its original form. Each data subset 1410 may be uniquely encrypted by encrypters 1420. The encrypted data subsets may then be converted from digital memory to an analog or digital signal carrier mode by appropriate transmission device 1425 for transfer through space. Typical signal carrier modes include radio waves 1427, infrared light 1429, ultrasound waves 1431, electron beam 1433, visible light 1437, and sound waves 1439. Other non-limiting examples include ultraviolet light, subatomic particle beam, and x-rays. Non-limiting examples of transmission device 1425 include a radio modulator plus antenna system, light emitting diodes, laser systems, x-ray tube, and electron gun, among others. Signal appropriate detectors 1445 collect the signals of the various media and decrypters 1450 decrypt the data into received data subsets 1460. Received data subsets 1460 are then reconstructed resulting in digital data 1470.

Figure 15:
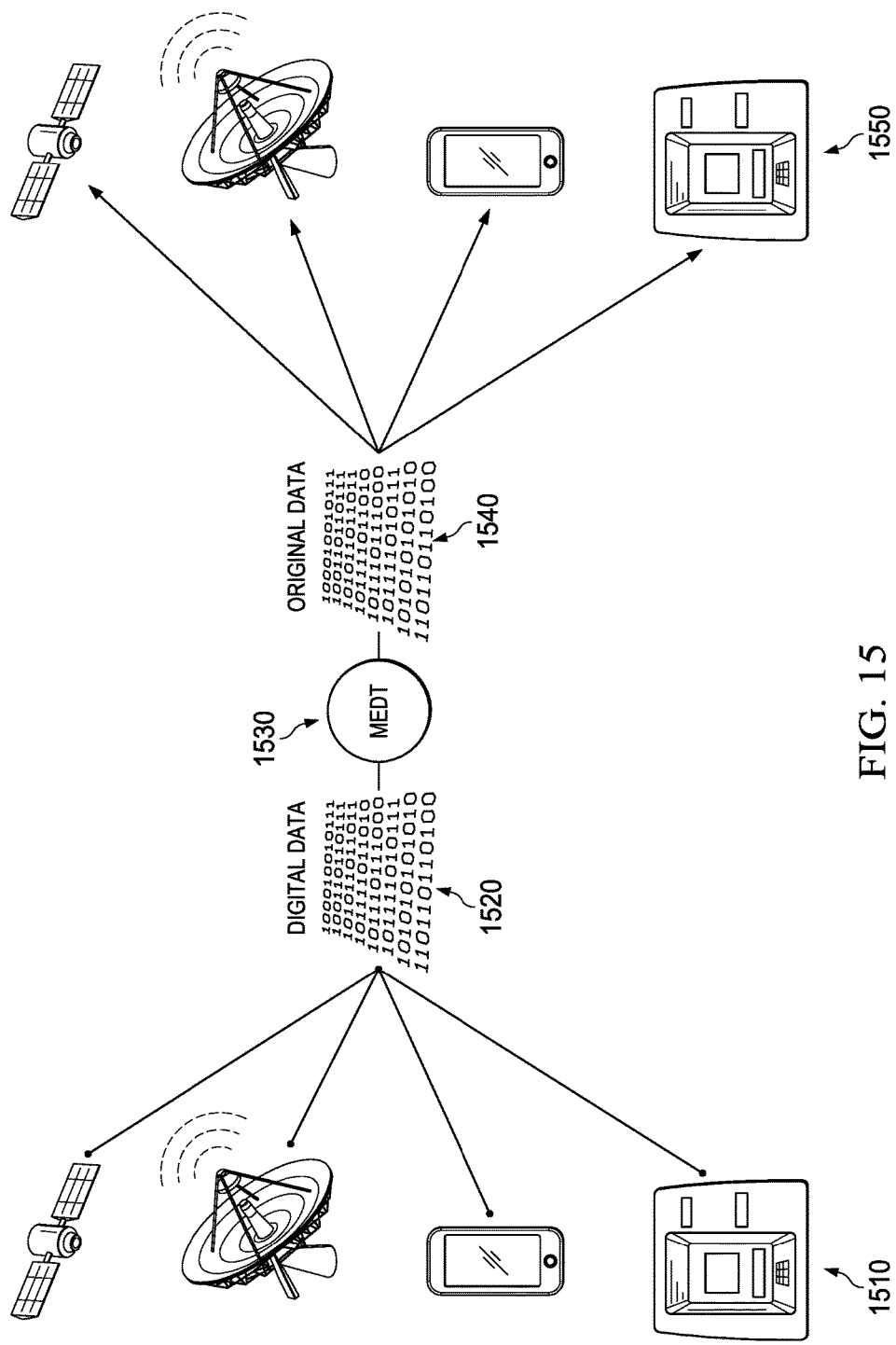
FIG. 15 is a system diagram of an example embodiment of equipment transceiving using multidimensional encrypted data transfer.

MEDT may be used to transfer signals to and from satellites, space vehicles, space stations, exoplanets, asteroids, broadcast stations, mobile devices, and fixed kiosks, among others. FIG. 15 provides an example embodiment of equipment transceiving using multidimensional encrypted data transfer. Digital data 1520 is originated from transmitting units 1510, encrypted, transmitted, received, and decrypted by MEDT system 1530, to produce received digital data 1540 for receiving units 1550.

FIG. 16 is a system diagram of an example embodiment of relay station equipment used in transceiving using multidimensional encrypted data transfer. In an example embodiment, relay stations 1620 (Space-based devices, whether Earth-orbital/exoplanet orbital or exoplanetary, inter-planetary and intra-exoplanetary, Lagrange-positioned and free Space, extra-solar system, fixed and mobile land stations, or mobile devices) receive physical signal 1610 (in various formats) without decrypting (in order to keep sensitive data from being read at relay stations) and re-transmit the data with different physical process 1630 with or without another encryption of the already encrypted signal.

MEDT may also be used in short range transactions. In short range transactions, additional security protocols may be used, such as non-interceptable signal transmission modes and authorized user authentication, among others. Non-limiting examples of non-interceptable transmission include close-range directed, coherent and/or incoherent visible light signals, sound waves, particle streams, photons, electro-magnetic spectrum particles/waves, and others. Non-limiting examples of authorized user authentication include finger print, voice recognition, and eye scan, among others.

Short range MEDT may occur by various means, similar to the means used in the long range MEDT of FIG. 14. In an example embodiment, digital data is input into the system. Digital data may then be separated into data subsets. All of the data subsets are used to decrypt and reconstruct the data back to its original form at the destination. Each data subset may be uniquely encrypted by encrypters. The encrypted data subsets may then be converted from digital memory to an analog of digital signal carrier mode by an appropriate transmission device for transfer through space. Typical signal carrier modes include radio waves, infrared light, ultrasound waves, electron beam, visible light, and sound waves. Non-limiting examples of transmission devices may include a radio modulator plus antenna system, light emitting diodes, laser systems, x-ray tube, and an electron gun, among others. Signal appropriate detectors collect the signals of the various media and decrypters decrypt the data into received data subsets. Received data subsets are then reconstructed resulting in the reconstructed digital data.

Figure 17:
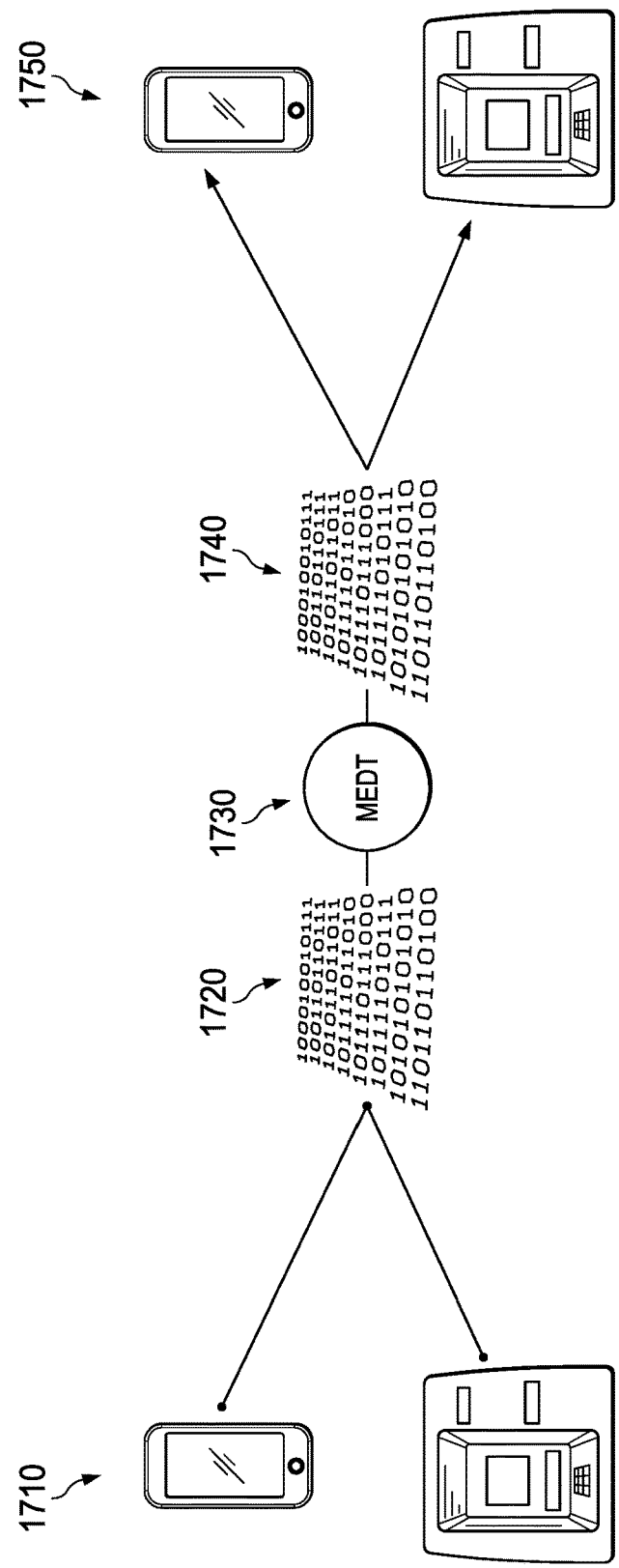
FIG. 17 is a system diagram of an example embodiment of equipment used in transceiving sensitive information securely using multidimensional encrypted data transfer.

FIG. 17 provides an example embodiment of equipment used in transceiving sensitive information securely using multidimensional encrypted data transfer. MEDT may be used to transfer, as non-limiting examples, financial, personally identifiable information (PII)/protected health information (PHI), defense/governmental, industrial, emergency management and other sensitive information securely. Data 1720 may be transmitted from devices 1710 using MEDT 1730 and received as data 1740 by devices 1750.

Figure 18:
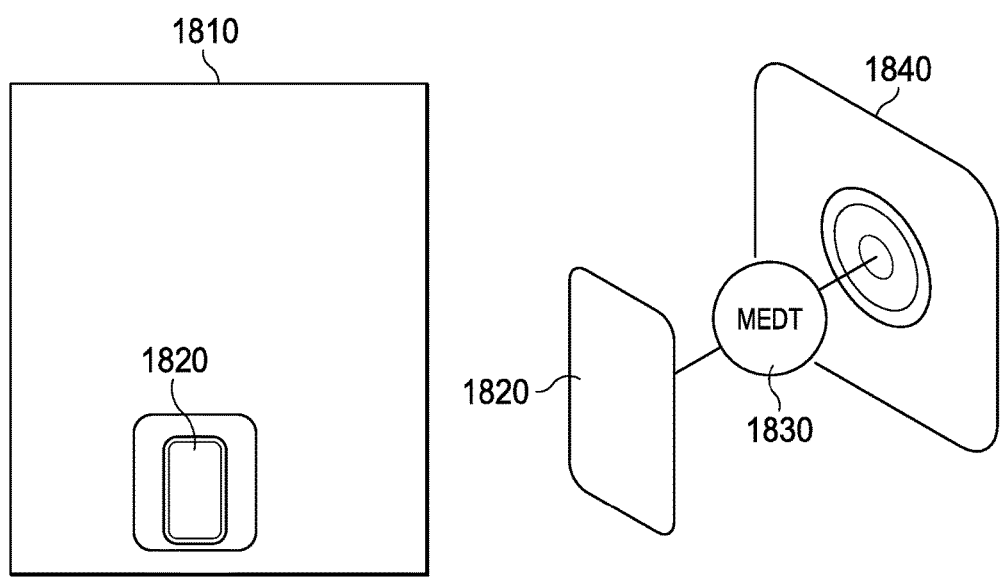
FIG. 18 is a system diagram of an example embodiment of a reading and transmitting device used in multidimensional encrypted data transfer.

Non-interceptable signal transmission may use non-broadcasted, directed methods. FIG. 18 provides an example embodiment of a reading and transmitting device used in multidimensional encrypted data transfer. Reading and transmitting device 1820 may reside in a kiosk, vending machine, gas station, or other receiving station or device 1810. Reading and transmitting device 1820 uses MEDT 1830 to securely transmit sensitive information to station device 1840. In an example implementation, short range directed signals are used to interact with the station device using a series of coded visible light signals along with sound and radio waves. Non-sensitive information may be broadcast using radio waves.

Authorized user authentication may be used in order to process a data transfer. In an example implementation, a transaction may be authenticated using biometric data, such as placing thumbs on a sensor to read the thumbprints. Alternatively, the transaction may be authenticated by speaking a random phrase with random words. A variety of methods may be used to authenticate transactions by authorized users.

The flow chart of FIG. 1 shows the architecture, functionality, and operation of a possible implementation of the multidimensional encrypted data structure transfer software. In this regard, each block represents a module, segment, or portion of code, which comprises one or more executable instructions for implementing the specified logical function(s). It should also be noted that in some alternative implementations, the functions noted in the blocks may occur out of the order noted in FIG. 1. For example, two blocks shown in succession in FIG. 1 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations can be made thereto without departing from the spirit and scope of the disclosure as defined by the appended claims.

Therefore, at least the following is claimed:

1. A system comprising:
    a splitter configured to receive an original data stream and split the data stream into multiple component streams;
    one or more encrypters configured to encrypt each of the component streams using one or more encryption methods and/or keys;
    a plurality of transmitters configured to substantially simultaneously transmit the encrypted component streams using a plurality of types of transmission media such that a plurality of receivers may receive the encrypted component streams for decryption and reassembly into a substantial representation of the original data stream; and
    a relay configured to receive at least one of the encrypted component streams and retransmit the at least one encrypted component stream; wherein the at least one encrypted component stream is retransmitted using a different medium from which it was received, and wherein the retransmission medium is selected to decrease propagation delay among component streams.

2. The system of claim 1, wherein the plurality of transmitters comprises a different type of transmitter for each of the multiple component streams.

3. The system of claim 1, wherein the at least one encrypted component stream is encrypted with a second level of encryption before retransmission.

4. The system of claim 1, wherein one or more of the transmitters use non-broadcasted directed methods.

5. A method comprising:
    splitting a data stream into multiple component streams;
    encrypting the component streams using one or more encryption methods and/or keys;
    transmitting the encrypted component streams using a plurality of types of transmission media substantially simultaneously such that a plurality of receivers may receive the encrypted component streams for decryption and reassembly into a substantial representation of the original data stream;
    receiving at a relay at least one of the encrypted component streams;
    retransmitting by the relay the at least one encrypted component stream, wherein the retransmitting of the at least one encrypted component stream comprises retransmitting the at least one encrypted component stream using a different medium from which it was received; and
    selecting the retransmission medium to decrease propagation delay among component streams.

6. The method of claim 5, wherein the transmitting is performed using a different type of transmitter for each of the multiple component streams.

7. The method of claim 5, wherein the plurality of transmission media includes at least one of radio, infrared light, ultraviolet light, x-rays, subatomic particle beam, visible light, and sound waves.

8. The method of claim 5, further comprising encrypting in the relay the at least one encrypted component stream with a second level of encryption before retransmission.

9. The method of claim 5, wherein transmitting comprises transmitting using non-broadcasted directed methods.

10. A relay system comprising:
   a plurality of receivers configured to receive multiple encrypted component streams on a plurality of transmission media;
   a plurality of transmitters configured to retransmit the encrypted component streams on different types of transmission media substantially simultaneously; and
   an encrypter configured to encrypt the received component streams, wherein at least one encrypted component stream is transmitted on a different medium from which it was received, and wherein the retransmission medium is selected is selected to decrease propagation delay among component streams.

* * * * *